US007865793B2

(12) United States Patent
Letz et al.

(10) Patent No.: US 7,865,793 B2
(45) Date of Patent: Jan. 4, 2011

(54) TEST CASE GENERATION WITH BACKWARD PROPAGATION OF PREDEFINED RESULTS AND OPERAND DEPENDENCIES

(75) Inventors: Stefan Letz, Boeblingen (DE); Juergen Vielfort, Althengstett (DE); Kai Weber, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 12/113,116

(22) Filed: Apr. 30, 2008

(65) Prior Publication Data

US 2009/0276610 A1 Nov. 5, 2009

(51) Int. Cl.
*G01R 31/28* (2006.01)
*G06F 11/00* (2006.01)
*G06F 7/38* (2006.01)
*G06F 9/44* (2006.01)

(52) U.S. Cl. .................. 714/738; 714/732; 708/495; 708/530; 717/124

(58) Field of Classification Search ............... 714/738, 714/741, 32, 33; 708/495, 530; 717/124, 717/134, 135; 716/4; 703/14
See application file for complete search history.

(56) References Cited

U.S. PATENT DOCUMENTS

| 4,357,703 | A * | 11/1982 | Van Brunt | 714/733 |
| 5,668,817 | A * | 9/1997 | Adham | 714/732 |
| 6,883,150 | B2 * | 4/2005 | Soltis et al. | 716/4 |
| 6,886,125 | B2 * | 4/2005 | Mangelsdorf | 714/739 |
| 7,028,067 | B2 * | 4/2006 | Abraham et al. | 708/530 |
| 2003/0220780 | A1 * | 11/2003 | Fallah et al. | 703/21 |
| 2005/0240645 | A1 * | 10/2005 | Ziv | 708/495 |
| 2005/0268189 | A1 * | 12/2005 | Soltis, Jr. | 714/724 |
| 2006/0206840 | A1 * | 9/2006 | Iwamura | 716/5 |
| 2007/0277022 | A1 * | 11/2007 | Bohizic et al. | 712/222 |

OTHER PUBLICATIONS

Zhong Ming; Xingan Jiang; Jiancong Bai; , "Partheno-Genetic Algorithm for Test Instruction Generation," Young Computer Scientists, 2008. ICYCS 2008. The 9th International Conference for , vol., no., pp. 1187-1192, Nov. 18-21, 2008 doi: 10.1109/ICYCS.2008.453.*
Watanabe, Y.; Salley, B.; Michael, B.; Brokenshire, D.; Meil, G.; Hazim Shafi; Hiraoka, D.; , "An SPU reference model for simulation, random test generation and verification," Design Automation, 2006. Asia and South Pacific Conference on , vol., no., pp. 7 pp., Jan. 24-27, 2006 doi: 10.1109/ASPDAC.2006.1594794.*

(Continued)

*Primary Examiner*—Cynthia Britt
(74) *Attorney, Agent, or Firm*—Randall Bluestone, Esq.

(57) ABSTRACT

A method of generating a test case from a given test case structure, the method including generating instructions for the given test case structure, propagating predefined results in a backwards manner, randomly generating remaining operands of the test case structure in a forwards manner, and calculating a result for the test case by determining missing input operands and storing these input operands in both the temporary register file and the initial register file, and calculating missing results and storing all results in the temporary register file.

1 Claim, 6 Drawing Sheets

OTHER PUBLICATIONS

Breech, B.; Pollock, L.; Cavazos, J.; , "RUGRAT: Runtime Test Case Generation Using Dynamic Compilers," Software Reliability Engineering, 2008. ISSRE 2008. 19th International Symposium on , vol., no., pp. 137-146, Nov. 10-14, 2008 doi: 10.1109/ISSRE.2008.28.*

Aharoni, Merav. et al., "FPgen—A test Generation Framework for Dispatch Floating-Point Verification", In Proc. IEEE International High Level Design Validation and Test Workshop 2003 (HLDVT03), 2003.

"IEEE Standard for Binary Floating-Point Arithmetic" 754-1985.

Duale, A.Y., "Decimal Floating-Point in a9: An Implementation and Testing Perspective", IBM Journal of Research and Development, vol. 51, No. 1-2, 2007, pp. 217-228.

Aharoni, Merav, et al., "Solving Contraints on the Intermediate Result of Decimal Floating-Point Operations", To appear in Proc. Arith. 18, 2007.

Ziv, Abraham, et al., "Test Generation for the Binary Floating Point Add Operation with Mask-Mask-Mask Constraints", Theoretical Computer Science, vol. 291-292, 2002, pp. 183-201.

Ziv, Abraham, et al., "Solving Range Constraints for Binary Floating-Point Instructions", In Proc. Arith. 16, 2003, pp. 158-164.

Aharoni, Merav, et al., "Solving Constraints on the Invisible Bits of the Intermediate Result for Floating-Point Verification" In Proc. Arith. 17, 2005, pp. 76-83.

* cited by examiner

TEST CASE GENERATION WITH BACKWARD PROPAGATION OF PREDEFINED RESULTS AND OPERAND DEPENDENCIES

BACKGROUND OF THE INVENTION

1. Field of the Invention

The present invention generally relates to a method and apparatus for test case generation and more particularly to a method and apparatus for verifying sequences of arithmetic processor instructions (especially floating point instructions) with varying data to produce correct (expected) results via test cases.

2. Description of the Related Art

A conventional z7 floating point unit (FPU) implements several hundred instructions and multiple different number formats. For simulation, test cases are used to verify the correctness of the FPU. A test case should cover "interesting" scenarios, e.g., reuse of previously generated results, exceptions, instructions that use different formats, etc. A test case may consist of initial values, instructions, and expected results.

In order to simulate a FPU, conventional random test case generators are used. Conventional random test generators are very fast but do not provide much control on the instructions/operands that get generated. In addition, in the conventional random test generators usually only initial values can be specified.

Another conventional method to simulate a FPU employs constraint-solving based test case generators (for example, the FPgen test case generator). Constraint-solving based test case generators provide total user-control over the generation of one instruction, but are very slow.

With the conventional test case generators, it is impossible to generate interesting test cases with full control over their generation.

As a result, the conventional test case generators tend to generate large amounts of untargeted random tests and try to get good coverage. As a result, coverage implementation is very time intensive and it is hard to close coverage holes.

On the other hand, another conventional method to generate test cases includes manually creating a small number of tests with the interesting scenarios. The drawback for this method is that it can only be done for a very small number of tests.

Another conventional method of test case generation is to use constraint-solving based test case generators such as FPgen to generate one interesting instruction and randomly generate instructions around it. However, coverage analysis is needed to find out whether the interesting scenario was hit or not.

SUMMARY OF THE INVENTION

In view of the foregoing, and other, exemplary problems, drawbacks, and disadvantages of the conventional systems, it is an exemplary feature of the present invention to provide a method of generating a test case from a given test case structure, the method including generating instructions for the given test case structure, the generating of instructions including taking predefined instruction mnemonics from the test case structure, resolving instruction groups by randomly selecting a group member, and resolving a wildcard in the instruction mnemonic by randomly entering an instruction for the wildcard, propagating predefined results in a backwards manner, starting with the last entry in the test case structure, the propagating including calculating missing input operands required to obtain a predefined result, and storing values of these input operands in a temporary register file, randomly generating remaining operands of the test case structure in a forwards manner, starting with the first entry of the test case structure, the generating including copying the input operand values stored in the temporary register file to an initial register file, and calculating a result for the test case by determining missing input operands and storing these input operands in both the temporary register file and the initial register file, and calculating missing results and storing all results in the temporary register file.

In the propagating, if both the result is a specific value and the result address is a specific register address and the corresponding temporary register contains a specific value, and the two values are different, returning a conflict. In the propagating, if both the result references an operand group and the result address is a specific register address and the corresponding temporary register contains a specific value, and the temporary register value matches the operand group, filling the result with the temporary register value. In the propagating, if the temporary register value does not match the operand group, returning a conflict. In the propagating, if the result references an operand group, resolve operand group by randomly selecting one group member. In the propagating, if the result address is a specific register address and the corresponding temporary register contains a specific value, filling the result with the value from the temporary register file. In the propagating, if the result address is not a specific register address, choosing the result address such that it matches the instruction definition and refers to an unused temporary register.

If in the propagating, if there is no solution, returning a conflict. If a conflict is returned, resolving the conflict. In the generating of the remaining operands, if a result address does not contain a specific address, choosing the result address such that the result address matches the instruction definition and refers to an unused temporary register.

Thus, exemplary embodiments of the present invention employ a table format and a parameter file to define an "interesting scenario," and can allow for custom test generation and fast performance. Thus, the present invention provides both fast and powerful test case generation, enables user to specify partially predefined input values, results, and instructions, allows user to formulate interesting test scenarios in precise and flexible manner, and enables simulation to cover as much interesting area of the given state space as possible.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF EXEMPLARY EMBODIMENT OF THE INVENTION

Figure 1:
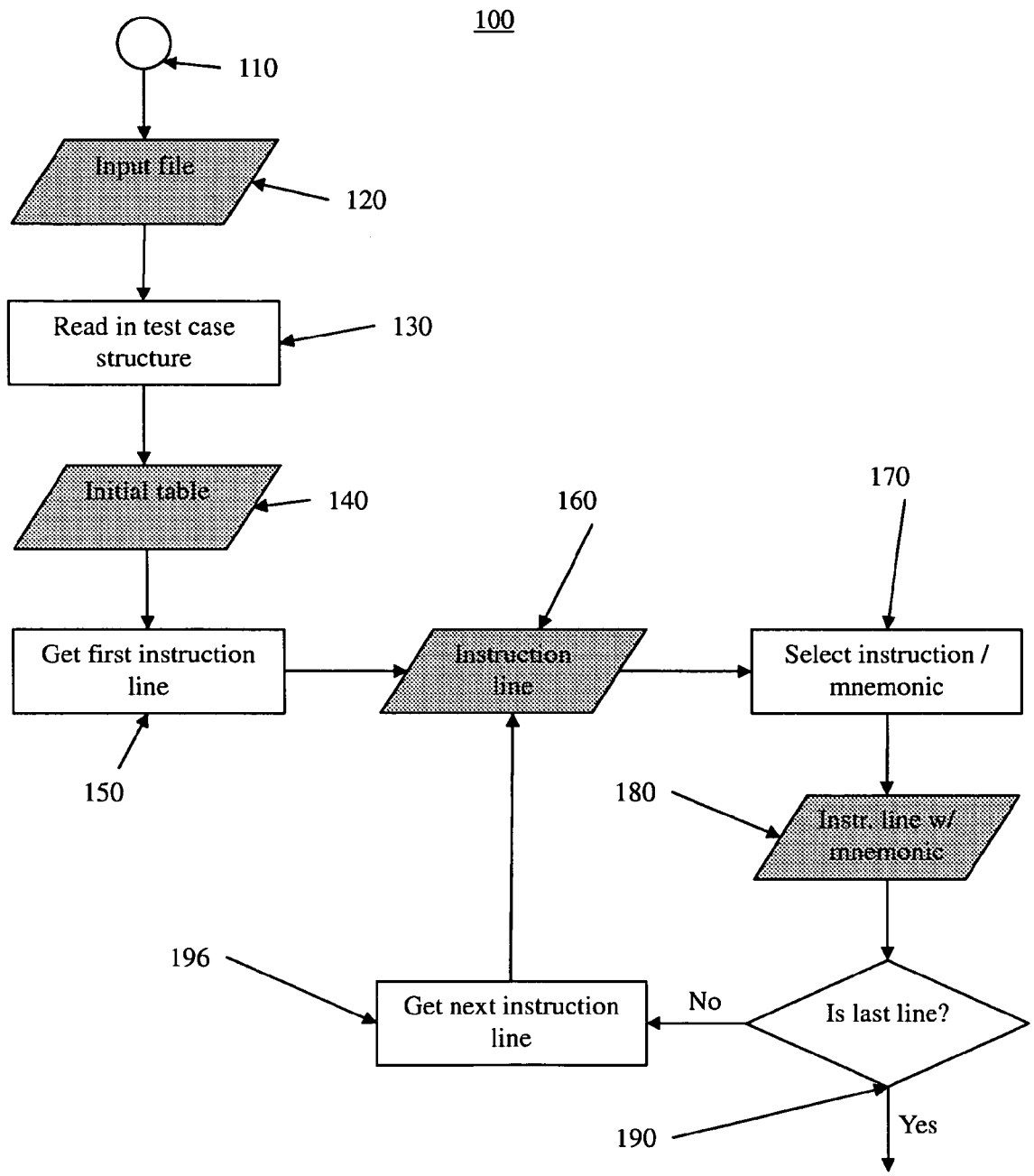
FIG. 1 illustrates an exemplary method 100 for generating instructions.

Referring now to the drawings, and more particularly to FIGS. 1-5, there are shown exemplary embodiments of the method and structures according to the present invention.

In an exemplary method, in order to generate a test case, the user would exemplarily specify an input file. This input file contains a test case structure with one line for each instruction of the instruction sequence that is to be generated. Each line would consist of the following fields: instruction mnemonic, input operand 1, input operand 2, input operand 3, result, result address, register address 1, register address 2, register address 3, and additional instruction fields as required by the processor architecture.

For each line of the input file, the user could specify anything from no fields to all fields, including the result field. The user may also reference certain predefined instruction groups and operand groups. For example, exemplary instruction groups may include any of the following instructions: any pipelined instruction, any non-pipelined instruction, binary single-precision instruction, binary double-precision instruction, binary extended-precision instruction, hexadecimal single-precision instruction, hexadecimal double-precision instruction, hexadecimal extended-precision instruction, etc.

In an exemplary method, exemplary operand groups could include any of the following: subnormal binary floating-point number, normal binary floating-point number, unnormalized hexadecimal floating-point number, normalized hexadecimal floating-point number, binary floating-point infinity, binary floating-point not-a-number, binary floating-point zero, etc.

Referring to Table 1, an exemplary test case structure looks as follows. For example, fields that the user does not want to specify contain a certain symbol, e.g., the wildcard symbol "*".

For example, for a list of forbidden register addresses: "!5, !7, !9". This means "any register but registers 5, 7, and 9" or "do not use registers 5, 7, and 9 for this register address".

In an exemplary embodiment of the test case of Table 1, RES ADDR will always be equal to the R1 ADDR. So R1 ADDR is the address of the register holding the first input operand OP1 as well as the instruction's result RES. Furthermore, not all instructions use the first input operand and not all instructions produce a numeric result.

In an exemplary method to create a test case, predefined mnemonics are taken from the test case structure, instruction groups are resolved by randomly selecting one group member, and wildcards in the mnemonic field are resolved by randomly selecting one instruction from all available instructions.

Next, in an exemplary method to create a test case, a temporary register file, consisting of one entry for each floating point register as defined by the processor architecture, is provided. Initially, all registers in the temporary register file are marked as unused (i.e., random/empty).

Next, predefined results are propagated backwards. For each instruction line, starting with the last one, check whether (a) RES is a specific value, (b) RES references an operand group, and/or (c) RES ADDR is a specific register address and the corresponding temporary register contains a specific value. If both (a) and (c), and the two values are different, there is a conflict. If both (b) and (c), and the temporary register value matches the operand group, then fill RES with the temporary register value. If the temporary register value does not match the operand group, there is a conflict. If (b), resolve operand group by randomly selecting one group member. If (c), fill RES with the value from the temporary register file.

If RES ADDR is not a specific register address, choose RES ADDR such that it matches the instruction definition and that it refers to an unused temporary register. If R1 ADDR is not a specific register address, choose R1 ADDR such that it

TABLE 1

| MNEM | OP1 | OP2 | OP3 | RES | RES ADDR | R1 ADDR | R2 ADDR | R3 ADDR |
|---|---|---|---|---|---|---|---|---|
| LOAD | * | * | * | bin_zero_op | 2 | 2 | 7 | * |
| * | 0x50000000 | * | * | * | 5 | 5 | * | * |
| pipelined_instr | * | * | * | * | * | * | 2 | * |
| bin_double_instr | * | * | * | 0x40000000 | 5 | 5 | * | * |
| ADD | 0x0230A10D | * | * | * | * | * | * | * |

In the exemplary test case structure of Table 1, MNEM is the mnemonic field and contains either a specific mnemonic, a reference to an instruction group, or the wildcard symbol. OP1, OP2, and OP3 are the input operand fields, each containing either a specific value, a reference to an operand group, or the wildcard symbol. RES is the result field and contains either a specific value, a reference to an operand group, or the wildcard symbol. RES ADDR, R1 ADDR, R2 ADDR, and R3 ADDR are the register address fields, each containing either a list of specific allowed and/or forbidden (marked by the "!" symbol) register addresses, or the wildcard symbol.

For example, for a forbidden register address: "!5". This means "any register but register 5" or "do not use register 5 for this register address".

matches the instruction definition and that it refers to an unused temporary register. If R2 ADDR is not a specific register address, choose R2 ADDR such that it matches the instruction definition and that it refers to an unused temporary register. If R3 ADDR is not a specific register address, choose R3 ADDR such that it matches the instruction definition and that it refers to an unused temporary register.

Then, calculate the missing input operands required to obtain RES and store the values of all input operands in the corresponding operand fields and in the temporary register file. If no solution can be found, there is a conflict.

At the end of the backward propagation of predefined results, the temporary register file contains the initial values of the registers that were referenced so far. Next, the initial register file is created by copying the temporary register file.

Then, the remaining operands are randomly generated. For each instruction line, starting with the first one, if RES ADDR does not contain a specific address, choose RES ADDR such that it matches the instruction definition and that it refers to an unused temporary register. For OP1, OP2, and OP3, and R1 ADDR, R2 ADDR, and R3 ADDR, respectively: If R ADDR does not contain a specific address: if OP contains the wildcard symbol, choose R ADDR such that it matches the instruction definition; if OP references an operand group, choose R ADDR such that is matches the instruction definition and that either the corresponding temporary register is unused or its value matches the operand group; if OP contains a specific value, choose R ADDR such that is matches the instruction definition and that either the corresponding temporary register is unused or it contains the same value.

If the temporary register selected by R ADDR contains a specific value: if OP contains the wildcard symbol, fill OP with the temporary register value; if OP references an operand group and the temporary register value matches this group, fill OP with the temporary register value; if OP references an operand group and the temporary register value does not match this group, there is a conflict; if OP contains a specific value and this value is different from the temporary register value, there is a conflict.

If the temporary register selected by R ADDR is unused: if OP contains the wildcard symbol, select a random value and fill OP, the temporary register, and the corresponding initial register with this value; if OP references an operand group, resolve the group by randomly selecting one group member and fill OP, the temporary register, and the corresponding initial register with this value; if OP contains a specific value, fill the temporary register and the corresponding initial register with this value.

Then, calculate result of the instruction. Fill RES and the corresponding temporary register with this value.

When the random generation is completed, the initial register file contains all initial register values required by the generated test case and the temporary register file contains all expected final register values.

When there is a conflict, several conflict resolution steps may be exemplarily employed. For example, some conflict resolution steps may include restarting the current generation step or returning back to a previous generation step, e.g., to try to select a different mnemonic for the current instruction line. In another exemplary conflict resolution, violate the test case structure by deleting the current instruction and continuing with the previous instruction, or by deleting the current instruction as well as all previous instructions and stopping.

FIG. 1 illustrates an exemplary embodiment of a method 100 for generating instructions. Referring to FIG. 1, at the start in Step 110, a file is input in Step 120. Next, the test case structure is read in Step 130. Moving to the first instruction line in Step 150, an instruction or mnemonic is selected for that instruction line in Step 170 and the line has a mnemonic in Step 180. In an exemplary embodiment of Step 170, the selection may be random. Step 170 may also include resolving a wildcard in the instruction mnemonic by randomly entering an instruction for that wildcard. The method 100 then determines if the last instruction line is reached in Step 190. If the last line has been reached, the method 100 proceeds to method 200. If the last instruction line has not been reached, the method 100 goes to Step 196 and to the next instruction line in Step 160.

Figure 2:
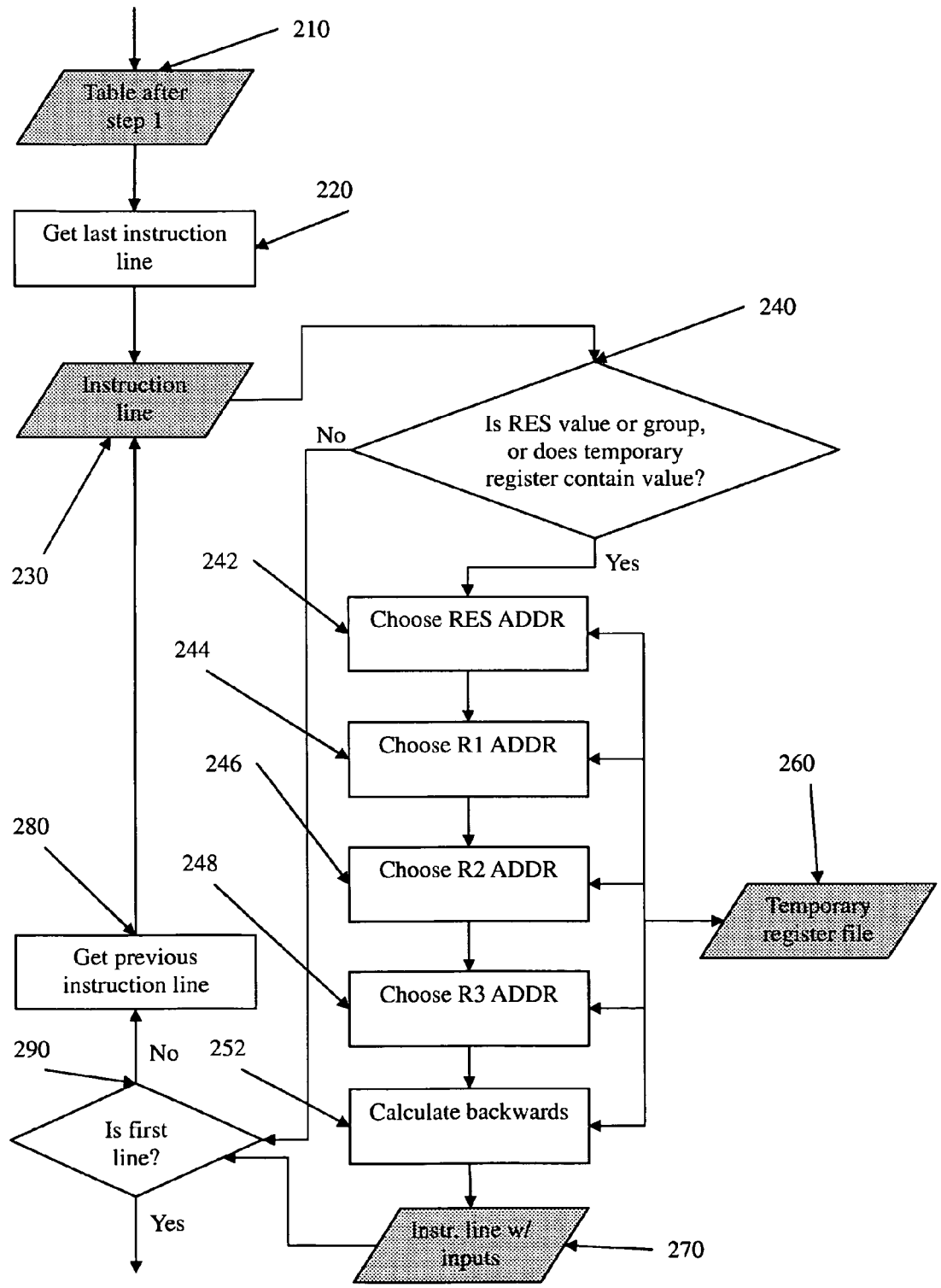
FIG. 2 illustrates an exemplary method 200 for backwards propagation of results.

FIG. 2 illustrates an exemplary embodiment of a method 200 for the backwards propagation of predefined results. Referring to FIG. 2, the table is returned from the completion of method 100. The method 200 proceeds to the last instruction line in Step 220. The method 200 then determines whether the result or temporary register for the instruction line contain a value in Step 240. If the result or temporary register does not contain a value, the method 200 proceeds to check if the instruction line is the first line (and therefore the last instruction line for method 200) in Step 290.

In an exemplary embodiment of method 200, if a result address does not contain a specific address, Step 242 chooses the result address such that the result address matches the instruction definition and refers to an unused temporary register. In addition, in another exemplary embodiment of Step 242, if both the result is a specific value and the result address is a specific register address and the corresponding temporary register contains a specific value, and the two values are different, returning a conflict.

In addition, in another exemplary embodiment of Step 242, if both the result references an operand group and the result address is a specific register address and the corresponding temporary register contains a specific value, and the temporary register value matches the operand group, filling the result with the temporary register value. In addition, in another exemplary embodiment of Step 242, if the result address is a specific register address and the corresponding temporary register contains a specific value, filling the result with the value from the temporary register file. In addition, in another exemplary embodiment of Step 242, if the result address is not a specific register address, choosing the result address such that it matches the instruction definition and refers to an unused temporary register.

If Step 240 determines that the result or temporary register contains a value, method 200 proceeds to Step 242 to choose a result address, to Step 244 to choose a register address 1, to Step 246 to choose a register address 2, to Step 248 to choose a register address 3, and to Step 252 to calculate backwards. In Step 260, the values of the input operands of Step 242, Step 244, Step 246, Step 248, and Step 252 would be stored in a temporary register file. In an exemplary embodiment, Step 252 would include calculating a missing input operand required to obtain a predetermined result. In an exemplary embodiment of method 200, in Step 260, the values of the input operand from Step 252 would be stored in the temporary file register.

At Step 270, an instruction line with inputs is therefore provided. The method 200 then proceeds to Step 290 to determine if the current line is the first line.

Figure 3:
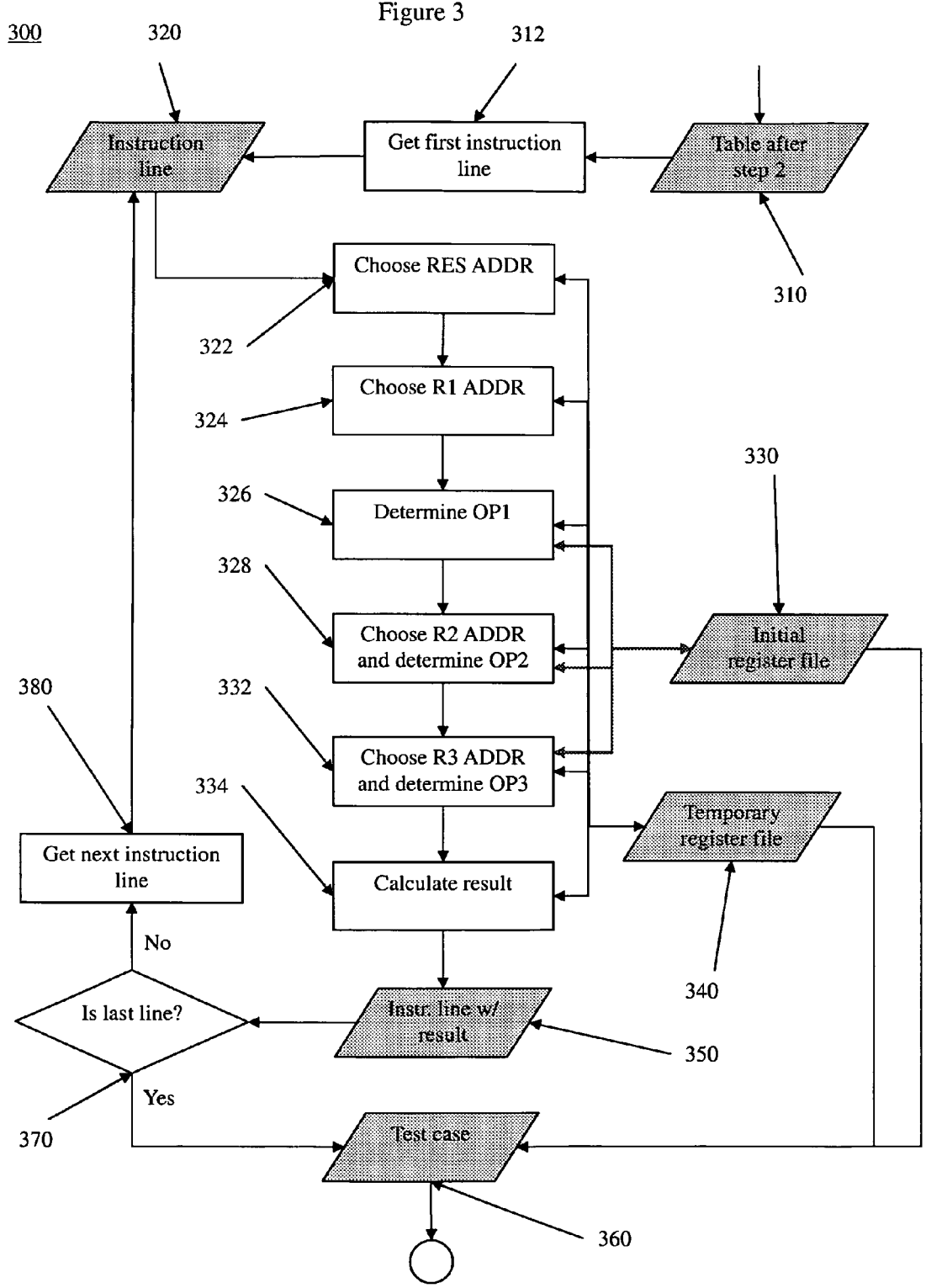
FIG. 3 illustrates an exemplary method 300 for the random generation of remaining operands.

FIG. 3 illustrates an exemplary embodiment of a method 300 for the random generation of remaining operands. Referring to FIG. 3, at Step 310, the table after method 200 is provided. At Step 312, the first instruction line is located. At the current instruction line 320, the following steps are performed: the result address is chosen 322, the register address 1 is chosen, the first operand is chosen 326, the register address 2 is chosen and the second operand is determined 328, the third register address is chosen and the third operand is determined 332, and then the result is calculated 334. In an exemplary embodiment of Step 322, if a result address does not contain a specific address, choosing the result address such that the result address matches the instruction definition and refers to an unused temporary register.

The results of Step 326, Step 328, and Step 332, are provided to an initial register file in Step 330. The results of Step 322, Step 324, Step 326, Step 328, Step 332, and Step 334 are provided to the temporary file register file in Step 340. After Step 334, the instruction line has a result in Step 350.

In an exemplary embodiment of method 300, Step 334 would include calculating a result for the test case by determining missing input operands and storing these input operands in both the temporary register file of Step 340 and the initial register file of Step 330. Step 334 could also include calculating missing results and then storing all results in the temporary register file in Step 340.

Following Step 350, Step 370 determines if the last line has been completed. If the last line has not been completed, Step 380 proceeds to the next instruction line and the method 300 proceeds to Step 320. If the last line has been finished, the test case is provided in Step 360.

Additionally, input constraints may be violated by choosing or generating different inputs, or result constraints may be violated by producing a different result. Finally, other register addresses may be selected or instructions may be inserted (e.g., loads) to set up specific register values.

Figure 4:
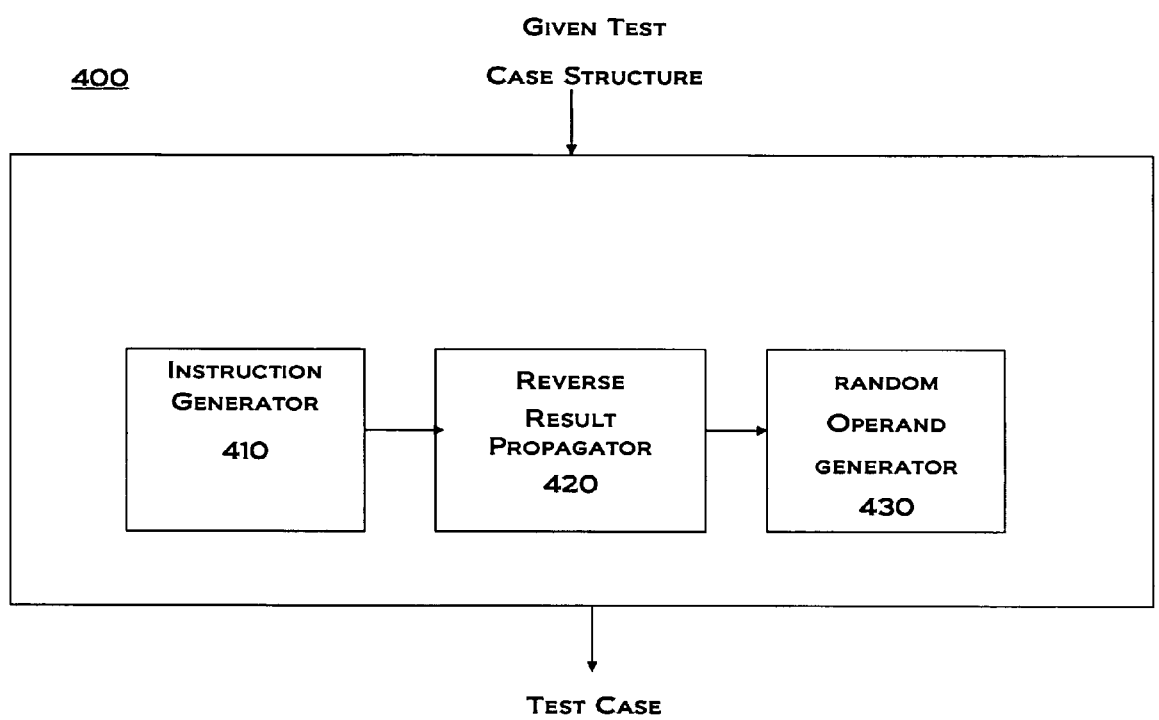
FIG. 4 illustrates an exemplary Sequence Verifier 400 for the verification of arithmetic processor instructions.

FIG. 4 illustrates an exemplary sequence verifier 400 for the verification of arithmetic processor instructions. Referring to FIG. 4, sequence verifier 400 may include instruction generator 410, reverse result propagator 420, and random operand generator 430. The instruction generator 410, reverse result propagator 420, and random operand generator 430 may operate according to the method 100 for generating instructions, method 200 for backwards propagation of results, and method 300 for the random generation of remaining operands, as described above.

Figure 5:
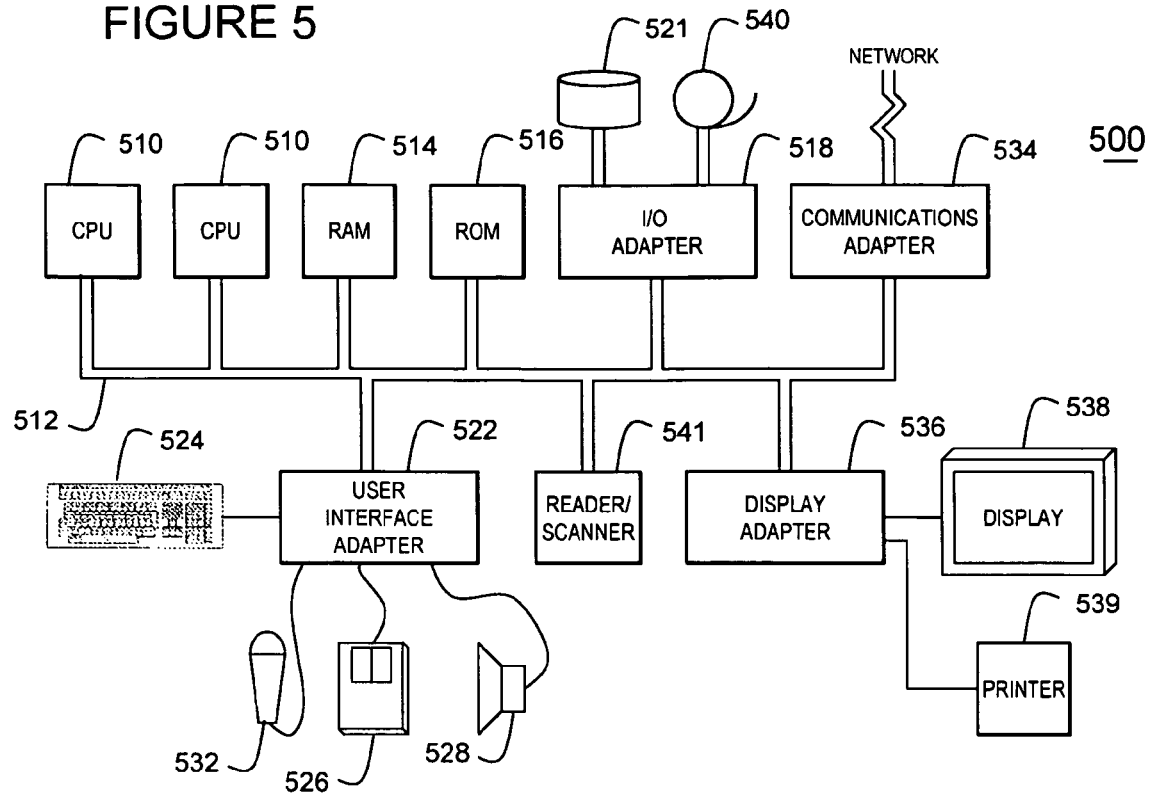
FIG. 5 illustrates a typical hardware configuration 500 which may be used for implementing the computer system and method according to the exemplary aspects of the present invention.

Referring again to the drawings, FIG. 5 illustrates a typical hardware configuration which may be used for implementing the computer system and method according to the exemplary aspects of the present invention. The configuration has preferably at least one processor or central processing unit (CPU) 510. The CPUs 510 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, and Intranet, a personal area network (PAN), etc., and a display adapter 536 for connecting the bus 512 to a display device 538 and/or printer 539. Further, an automated reader/scanner 541 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 511 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 511 and hardware above, to perform the method of the invention.

Figure 6:
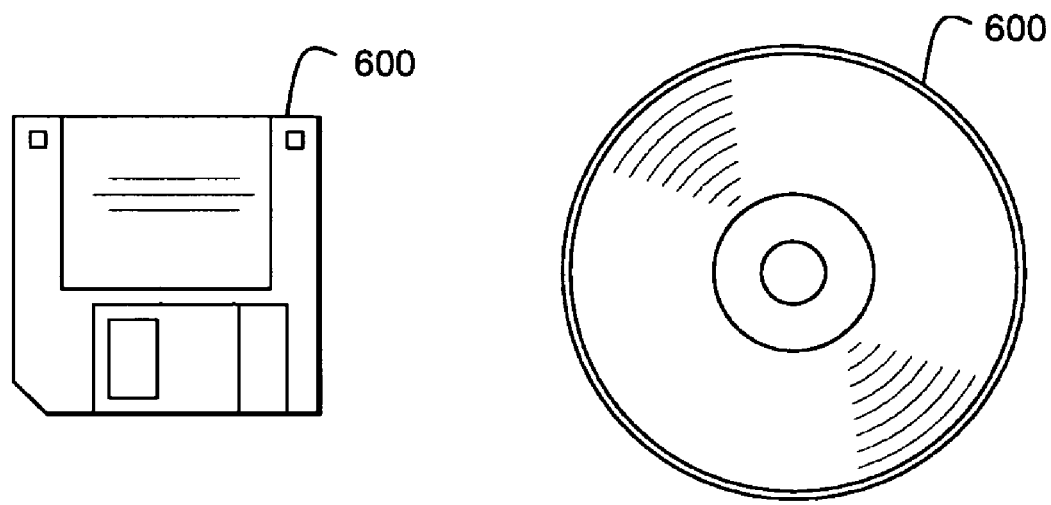
FIG. 6 illustrates a magnetic data storage diskette 600 to store the method of the present invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the computer server/CPU 511, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other tangible signal-bearing media including transmission media such as digital and analog media, and tangible signal-bearing media for communication links and wireless communication. In an illustrative embodiment of the invention, the machine-readable instructions may comprise software object code, complied from a language such as "C" etc.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of generating a test case from a given test case structure, the method comprising:
   generating instructions for the given test case structure, the generating of instructions comprising:
      taking predefined instruction mnemonics from the test case structure;
      resolving instruction groups by randomly selecting a group member; and
      resolving a wildcard in the instruction mnemonic by randomly entering an instruction for the wildcard;
   propagating predefined results in a backwards manner, starting with the last entry in the test case structure, the propagating comprising:
      calculating missing input operands required to obtain a predefined result; and
      storing values of these input operands in a temporary register file; and
   randomly generating remaining operands of the test case structure in a forward manner, starting with the first entry of the test case structure, the generating comprising:
      copying the input operand values stored in the temporary register file to an initial register file; and
      calculating a result for the test case by determining missing input operands and storing these input operands in both the temporary register file and the initial register file; and
      calculating missing results and storing all results in the temporary register file,
   wherein in the propagating, if both the result is a specific value and the result address is a specific register address and the corresponding temporary register contains a specific value, and the two values are different, returning a conflict,
   wherein in the propagating, if both the result references an operand group and the result address is a specific register address and the corresponding temporary register contains a specific value, and the temporary register value matches the operand group, filling the result with the temporary register value, wherein in the propagating, if the temporary register value does not match the operand group, returning a conflict, wherein in the propagating, if the result references an operand group, resolve operand group by randomly selecting one group member, wherein in the propagating, if the result address is a specific register address and the corresponding temporary register contains a specific value, filling the result with the value from the temporary register file, wherein in the propagating, if the result address is not a specific register address, choosing the result address such that it matches the instruction definition and refers to an unused temporary register, wherein in the propagating, if there is no solution, returning a conflict, wherein if a conflict is returned, resolving the conflict, and wherein in the generating of the remaining operands, if a result address does not contain a specific address, choosing the result address such that the result address matches the instruction definition and refers to an unused temporary register.

* * * * *